United States Patent [19]

Akamatsu et al.

[11] Patent Number: 5,277,108
[45] Date of Patent: Jan. 11, 1994

[54] ROTATING CYLINDRICAL TREATMENT APPARATUS

[75] Inventors: Hirokazu Akamatsu, Yokkaichi; Toyokazu Uda, Kitakyushu; Masahiro Nishida, Yokkaichi, all of Japan

[73] Assignee: Mitsubishi Kasei Engineering Co., Tokyo, Japan

[21] Appl. No.: 787,115

[22] Filed: Nov. 4, 1991

[30] Foreign Application Priority Data

| Nov. 8, 1990 | [JP] | Japan | 2-301069 |
| Nov. 8, 1990 | [JP] | Japan | 2-301070 |
| Nov. 8, 1990 | [JP] | Japan | 2-301071 |
| Nov. 8, 1990 | [JP] | Japan | 2-301072 |
| Nov. 14, 1990 | [JP] | Japan | 2-306128 |
| Nov. 30, 1990 | [JP] | Japan | 2-330047 |

[51] Int. Cl.⁵ ............................................. B29F 3/08
[52] U.S. Cl. ............................ 100/93 RP; 100/153; 425/373; 165/89
[58] Field of Search ............... 425/373, 370; 264/175; 198/810, 807, 842, 476; 29/123, 129, 110; 474/102, 103, 104, 105, 106, 107, 108; 165/89, 90; 100/43, 93

[56] References Cited

U.S. PATENT DOCUMENTS

| 1,818,685 | 8/1931 | Brunk | 474/107 |
| 1,994,360 | 3/1935 | Hurxthal | 165/90 |
| 2,146,245 | 2/1939 | Barnes | 165/89 |
| 3,492,741 | 2/1970 | Witworth | 165/90 |
| 3,805,950 | 4/1974 | Becker | 198/807 |
| 4,177,725 | 12/1979 | Gersbeck | 100/93 RP |
| 4,629,061 | 12/1986 | Crandall | 198/802 |
| 4,744,854 | 5/1988 | Schenz | 425/373 |
| 4,934,928 | 6/1990 | Akamatsu | 425/373 |
| 5,007,523 | 4/1991 | Morefield | 198/497 |

FOREIGN PATENT DOCUMENTS

| 0619880 | 5/1961 | Canada | 425/373 |
| 0354763 | 10/1905 | France | 165/90 |

Primary Examiner—Harvey C. Hornsby
Assistant Examiner—Reginald L. Alexander
Attorney, Agent, or Firm—Oblon, Spivak, McClelland, Maier & Neustadt

[57] ABSTRACT

A rotating cylindrical treatment apparatus for accomplishing rolling and heat-treatment of a treated material continuously and with high reliability. The apparatus includes a deviation detecting device provided at a suitable position for detecting deviation of an endless belt to generate a signal and an axis inclination structure for varying an inclination of at least one of belt support rollers depending upon the signal generated from the deviation detecting device, so that the deviation may be automatically corrected without interrupting the operation of the apparatus.

3 Claims, 11 Drawing Sheets

ROTATING CYLINDRICAL TREATMENT APPARATUS

BACKGROUND OF THE INVENTION

1. Field of the Invention

This invention relates to a rotating cylindrical treatment apparatus, and more particularly to an apparatus for supplying, in the form of a suitable shape such as a sheet-like shape or the like, a material to be heated or cooled such as synthetic resin, smashed fish, smashed meat or the like and pressing the sheet-like material against a heated or cooled surface of a rotating cylindrical body to treat it.

2. Discussion of the Related Art

Figure 4:
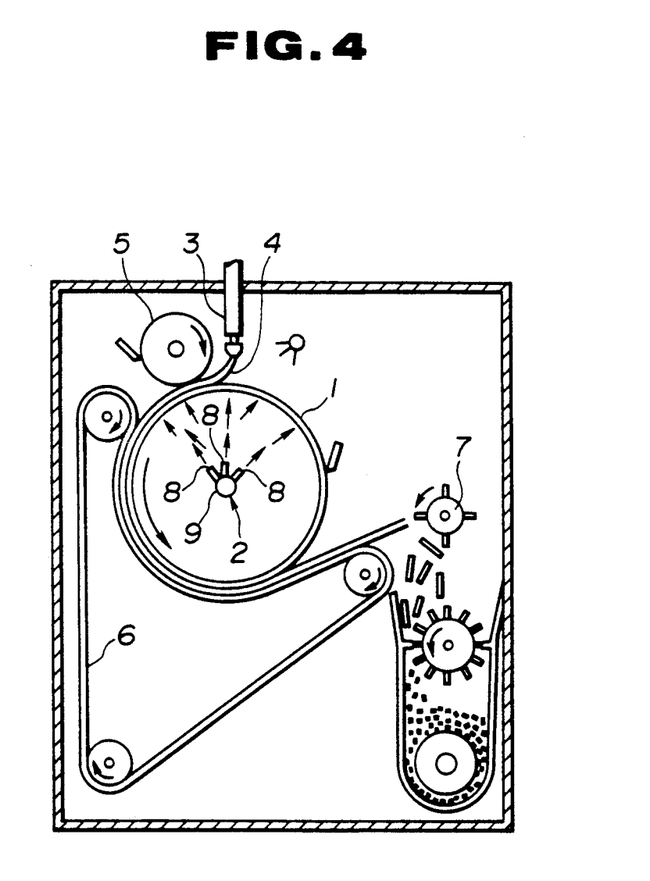
FIG. 4 is a vertical sectional view schematically showing a conventional rotating cylindrical treatment apparatus.

A rotating cylindrical treatment apparatus of this type is known in the art, as disclosed in Japanese Patent Application Laid-Open Publication No. 225882/1987 and generally constructed in such a manner as shown in FIG. 4. More particularly, the conventional rotating cylindrical treatment apparatus generally includes a cylindrical body 1 of which a revolving axis is orientated in a horizontal direction, a heating or cooling mechanism 2 provided in the cylindrical body 1, a feed section 3 for feeding a material 4 to be treated (hereinafter referred to as "treated material") which is positioned above the cylindrical body 1, a pressure roller 5 for pressing the treated material 4 fed to the cylindrical body 1 against the cylindrical body to roll it, an endless belt 6 for conveying the treated material 4 while keeping it pressed upon the cylindrical body 6, and a crusher 7 for crushing the treated material 4 separated from the cylindrical body 1. In FIG. 4, reference numeral 8 designates a spray nozzle provided at a feed pipe 9 for spraying an inner surface of the cylindrical body 1 with a gas-liquid mixture comprising pressurized air and a heating or cooling medium for heating or cooling the cylindrical body 1.

The conventional rotating cylindrical treatment apparatus constructed as described above has a disadvantage in that the endless belt 6 tends to shift or deviate in an axial direction of guide or support rollers around which it is passed, to thereby cause the treated material to deviate from a material carrying position predetermined on the cylindrical body 1, resulting in a part of the treated material being relatively dislocated from the endless belt 6. Also, the conventional apparatus exhibits a further disadvantage of causing the endless belt 6 to be contacted with various components arranged on both sides of the cylindrical body 1, leading to damage of the endless belt. In order to avoid the above problems, the conventional rotating cylindrical treatment apparatus adopted an approach in which the operation of the apparatus is visually monitored, so that the operation is stopped to correct a deviation of the endless belt upon the observation of the start of the deviation. Thus, the conventional apparatus does not provide for a continuous running with a high reliability.

In addition, in the conventional rotating cylindrical treatment apparatus, the cylindrical body 1 comprises only a hollow cylindrical plate member opened at both side ends and end plates arranged to close both ends of the cylindrical plate member and is free of any rib structure for reinforcing the cylindrical plate member. This is because the cylindrical body of the conventional rotating cylindrical treatment apparatus is relatively small in size, therefore, it is not required to provide a means for preventing deflection of the cylindrical body.

Recently, a volume of the treated material 4 to be handled has been highly increased, so that it is required to form the cylindrical body 1 into a large size. Unfortunately, the cylindrical plate member of the cylindrical body is made of a metal sheet of a relatively small thickness, therefore, an increase in diameter and length of the cylindrical body fails to permit the cylindrical body to exhibit desired functions while permitting only both end plates to keep the cylindrical plate member properly cylindrical. Thus, the large-sizing of the cylindrical body requires the arrangement of a rib structure in the cylindrical plate member. However, in order to permit the cylindrical body to effectively exhibit a desired heating or cooling function, it is required to not only constantly introduce a cooling or heating medium into the cylindrical body but successively discharge it through an outlet port while keeping a predetermined amount of the medium stored in the lower portion of the cylindrical body. Therefore, the arrangement of the rib structure in the cylindrical body blocks the flowing of the cooling or heating medium to the outlet port, to thereby cause the cylindrical body to be non-uniformly heated or cooled, leading to a failure in uniform cooling or heating of the treated material depending upon a position on the cylindrical body.

SUMMARY OF THE INVENTION

The present invention has been made in view of the foregoing disadvantage of the related art.

Accordingly, it is an object of the present invention to provide for a novel rotating cylindrical treatment apparatus which is capable of accomplishing stable continuous running with high reliability.

It is another object of the present invention to provide a rotating cylindrical treatment apparatus which is capable of automatically correcting the deviation of an endless belt.

It is a further object of the present invention to provide a rotating cylindrical treatment apparatus which is capable of exhibiting an efficient cooling or heating function.

It is still another object of the present invention to provide a rotating cylindrical treatment apparatus which is capable of ensuring smooth flowing of a cooling or heating medium in a cylindrical body.

In accordance with the present invention, a rotating cylindrical treatment apparatus is provided. The apparatus includes a cylindrical body rotatably arranged and including a heated or cooled surface to which a treated material is fed, a pressure roller for pressing the treated material fed to the surface of the cylindrical body against the surface of the cylindrical body, an endless belt passed through at least three support rollers and partially wound on the surface of the cylindrical body to convey the treated material rolled while pressing it against the surface of the cylindrical body, a deviation detecting device provided at a suitable position except a region of the endless belt wound on the cylindrical body for detecting deviation of the endless belt to generate a signal, and an axis inclination structure for varying an inclination of at least one of the belt support rollers depending upon the signal generated from the deviation detecting device.

In the rotating cylindrical treatment apparatus of the present invention constructed as described above, when the treated material is downwardly fed to the surface of the cylindrical body being rotated while being heated or cooled, it is immediately rolled into a sheet-like shape through the pressure roller and then introduced to the region of the endless belt wound on the cylindrical body, resulting in it being conveyed while being kept closely contacted with the surface of the cylindrical body, during which the treated material is subject to a heating or cooling treatment. When the endless belt starts to deviate during the treatment, the deviation detecting device detects the deviation to generate a signal, which is fed to the axis inclination adjusting structure, so that it adjusts the inclination of one of the belt support rollers supporting the endless belt thereon. A variation in inclination of the support roller causes the endless belt to travel so as to try to get to fit a whole width of the support roller, so that the endless belt tends to move in a direction opposite to a side of the support roller with which the endless belt is more pressedly contacted. This permits the inclination of the support roller to be adjusted in correspondence to a direction of deviation of the endless belt, resulting in the endless belt being corrected to a proper position.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a rotating cylindrical treatment apparatus according to the present invention will be described hereinafter with reference to the accompanying drawings.

Figure 1:
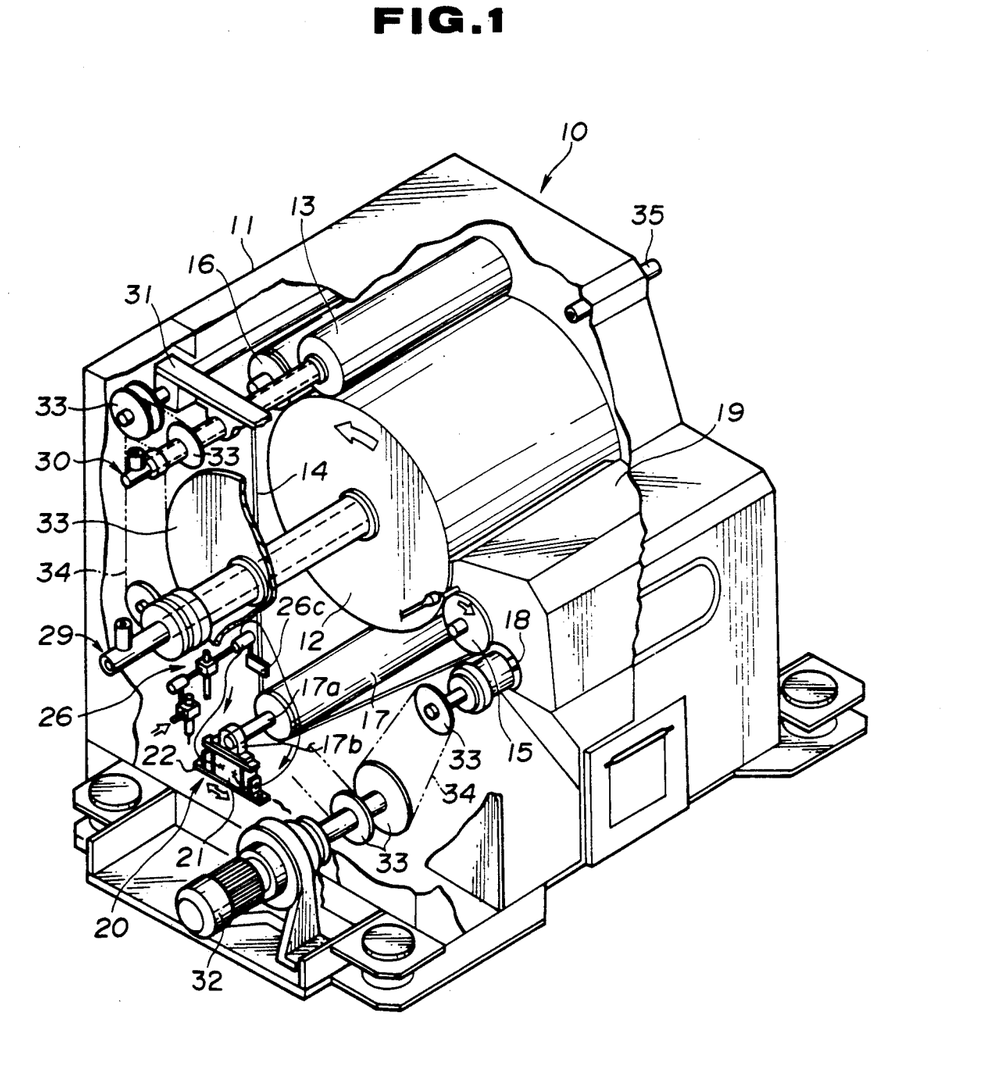
FIG. 1 is a partly cutaway perspective view showing an embodiment of a rotating cylindrical treatment apparatus according to the present invention.

FIG. 1 shows an embodiment of a rotating cylindrical treatment apparatus according to the present invention. A rotating cylindrical treatment apparatus of the illustrated embodiment generally designated at reference numeral 10 includes a casing 11 and a cylindrical body 12 rotatably arranged in the casing 11. The cylindrical body 12 is provided therein with a heating or cooling medium introducing and discharging unit (not shown) for cooling or heating a circumferential or peripheral surface of the cylindrical body 12. Above the cylindrical body 12 is arranged a feed section (not shown) for feeding a treated material to an outer peripheral surface of the cylindrical body 12 in a manner similar to the conventional rotating cylindrical treatment apparatus described above with reference to FIG. 4. Also, the apparatus of the illustrated embodiment includes a pressure roller 13 arranged adjacent to the outer peripheral surface of the cylindrical body 12 and the treated material feeding section so as to be rotated in a direction corresponding to that of the cylindrical body 12. The pressure roller 13 thus arranged cooperates with the cylindrical body 12 to roll the treated material fed from the feed section into a sheet-like shape having a predetermined thickness.

The rotating cylindrical treatment apparatus of the illustrated embodiment also includes an endless belt 14 stretchedly arranged in advance to the pressure roller 13 based on the direction of rotation of the cylindrical body 12 in a manner to be in proximity to the outer peripheral surface of the cylindrical body 12, which endless belt acts to convey the treated material rolled into a sheet-like shape while keeping it contacted with the surface of the cylindrical body 12. The endless belt 14 is arranged so as to pass around three guide or support rollers 15, 16 and 17 while being wound at a section or region thereof extending between the guide rollers 15 and 16 around a part of the cylindrical body 12. The region of the endless belt 14 wound on the cylindrical body 12 serves at a portion thereof positioned on the side of the guide roller 16 as an inlet for the treated material and at a portion thereof positioned on the side of the guide roller 15 as an outlet therefor.

In the vicinity of the outlet portion of the endless belt 14 which is the portion of the endless belt 14 acting as the outlet is arranged a crusher 18 for crushing the treated material which has been heated or cooled and formed into a strip-like shape while having been kept closely contacted with the peripheral surface of the cylindrical body 12. The crusher 18 functions to finely crush the treated material in the form of a sheet-like shape discharged through the outlet portion of the endless belt 14 and is surrounded at a portion thereof except both a portion thereof opposite to the cylindrical body 12 and a lower portion thereof for taking out the crushed material with a cover 19.

Figure 2:
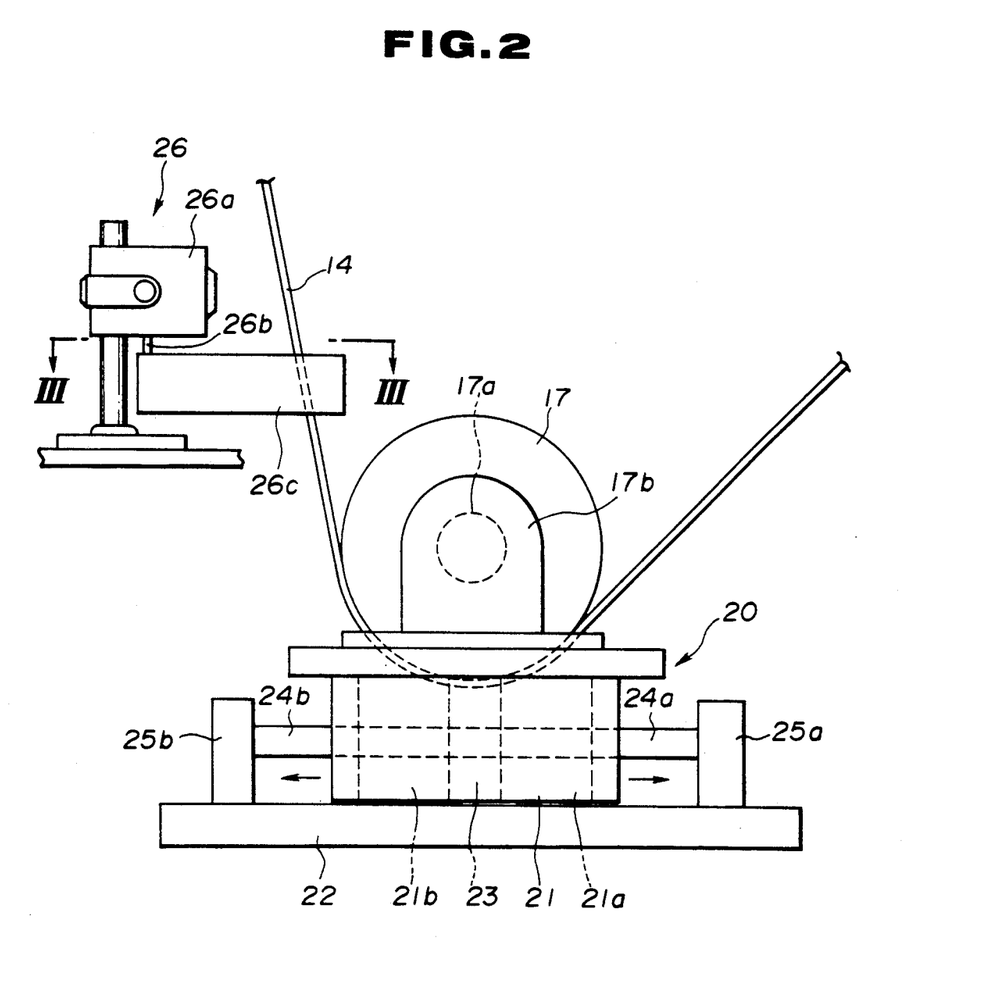
FIG. 2 is a schematic view showing an axis inclination adjusting device and a deviation detecting device provided in proximity to an and of a guide or support roller for supporting an endless belt in the rotating cylindrical treatment apparatus of FIG. 1.

The guide roller 17 for supporting the endless belt 14 includes a revolving shaft 17a for supporting the guide roller thereon. The revolving shaft 17a is supported at one end thereof in a bearing 17b mounted on a slider 21 constituting a part of an axis inclination adjusting mechanism 20. The slider 21, as shown in FIG. 2, may comprise a movable cylinder section slidably arranged on a base plate 22 of the rotating cylindrical treatment apparatus 10 which may comprise a floor. For this purpose, the slider 21 is provided therein with a piston 23 having first and second ends on which ends of piston rods 24a and 24b are connected, respectively. The piston rods 24a and 24b are arranged so as to outwardly extend toward the other ends thereof through both end plates of the movable cylinder or slider 21, respectively. Then, the other ends of the piston rods 24a and 24b are fixed to struts 25a and 25b, respectively. This causes the piston section 23 to be stationarily held in the slider 21, so that the piston section 23 divides the interior of the slide 21 into a right-hand chamber 21a and a left-hand chamber 21b, any one of which can be selectively supplied with pressurized air or oil. Thus, when working fluid in the other chamber is discharged therefrom, the slider 21 is moved in both lateral directions or left and right directions in FIG. 2. This results in the bearing 17b being moved in a diametric direction of the guide roller 17, so that a central axis of the guide roller 17 may be inclined relative to the endless belt 14. Thus, an angle of inclination of the guide roller 17 corresponds to the amount of movement of the slider 21.

The movement of the slider in the right or left direction and the amount of movement of the slider 21 are controlled depending upon a signal generated from a deviation detecting device 26 for detecting displacement or deviation of the endless belt 14 in an axial direction of the guide roller 17. The deviation detecting device 26 includes a device body 26a, a revolving shaft 26b arranged so as to extend from the device body 26a and an elongated sensor plate 26c fixed on one end of the revolving shaft 26b.

Figure 3:
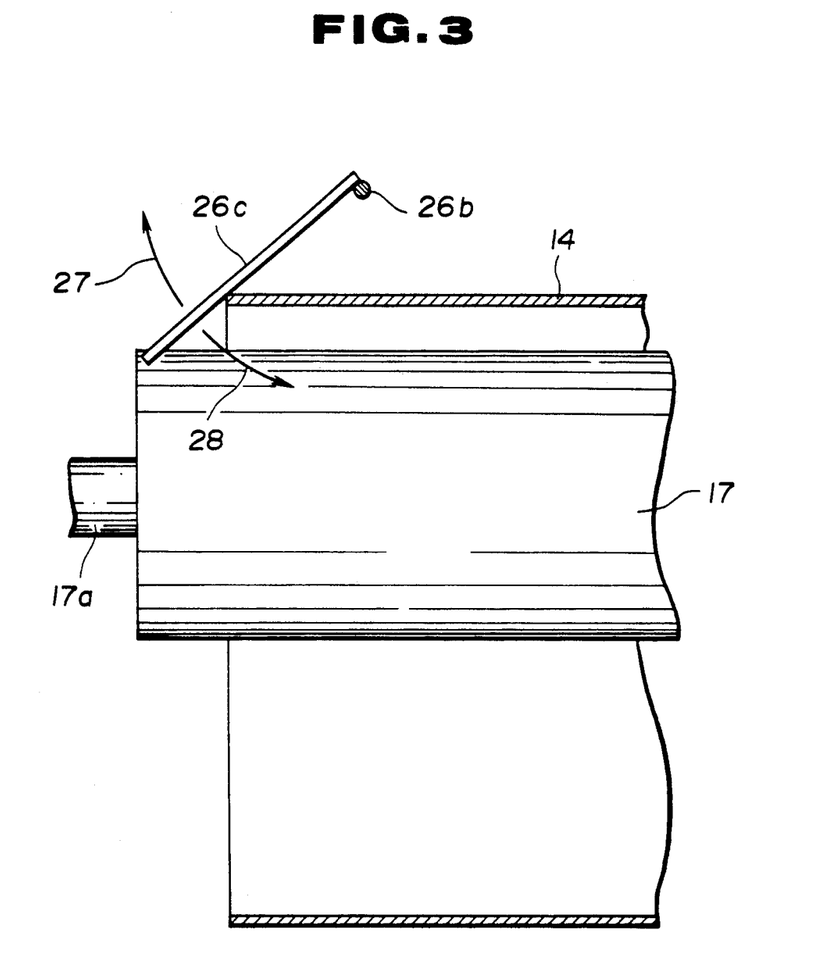
FIG. 3 is a sectional view taken along line III—III of FIG. 2 which shows the contacting of a sensor plate of the deviation detecting device with a side end of the endless belt.

The sensor plate 26c is arranged so as to be inclined with respect to a side end of the endless belt 14 at a suitable position near the guide roller 17 and a force for pressing the sensor plate against the side end of the endless belt 14 is applied to the sensor plate 26c through the revolving shaft 26b to contact the sensor plate 26c with the endless belt 14. The deviation detecting device 26 thus constructed functions to detect the deviation of the endless belt 14 and the amount of the deviation based on the position of the sensor plate 26c contacted with the side end of the endless belt 14. More particularly, when the endless belt 14 deviates in the left-hand direction as shown in FIG. 3, the sensor plate 26c is rotated in a direction indicated by an arrow 27; whereas when it deviates in the right-hand direction, the sensor plate 26c is rotated in a direction indicated at an arrow 28 which is opposite to the direction 27. Information on the direction and amount of rotation of the sensor plate 26c is fed through the revolving shaft 26b to the device body 26a, so that the direction and amount of deviation of the endless belt 14 may be detected, resulting in the device body 26a generating a signal corresponding to the deviation. The construction of the deviation detecting device 26 per se is known in the art, accordingly, it will not be further described.

In FIG. 1, reference numeral 29 designates a medium introducing section for introducing a heating or cooling gas-liquid mixture into the cylindrical body 12. FIG. 1 also shows a medium introducing section 30 for introducing a heating or cooling gas-liquid mixture into the pressure roller 13. Reference numeral 31 is an arm for holding a support shaft of the pressure roller 13, 32 is a motor, 33 is a sprocket mounted on each of the revolving shafts, 34 is a chain wound on each of the sprockets 33, and 35 is an air feed pipe for feeding dry air to the casing 11 as required.

Now, the manner of operation of the rotating cylindrical treatment apparatus of the illustrated embodiment constructed as described above will be hereinafter described.

Turning-on of the motor 32 causes the cylindrical body 12 and pressure roller 13 to be rotated. Then, when the treated material is fed from the feed section to an upper portion of the surface of the rotating cylindrical body 12, the pressure roller 13 immediately rolls the treated material into a sheet-like shape, which is then introduced to the region of the endless belt 14 wound on the cylindrical body and closely contacted with the outer peripheral surface of the cylindrical body 12 over a predetermined range of rotation of the cylindrical body 12, to thereby be fully subject to a heating or cooling treatment.

The treated material of a sheet-like shape thus treated is released from the force which presses it against the cylindrical body 12 at the outlet portion of the region of the endless belt wound on the cylindrical body 12, resulting in dropping from the endless belt 14 onto the crusher 18, which crushes the treated material.

It would happen that the endless belt 14 deviates from a predetermined position on the outer peripheral surface of the cylindrical body 12 in an axial direction of the cylindrical body 12 while the sheet-like treated material rolled by the pressure roller 13 is being conveyed between the endless belt 14 and the cylindrical body 12. When such a deviation of the endless belt 14 occurs, the sensor plate 26c of the deviation detecting device 26 is rotated or pivotally moved in an amount corresponding to the amount of deviation of the endless belt 14 in a direction corresponding to a direction of the deviation and the device body 26a detects the movement of the sensor plate 26c through the revolving shaft 26b to generate a signal.

The signal thus generated from the deviation detecting device 26 is input to a control device (not shown), which determines a feeding of pressurized air to any one of the right-hand and left-hand cylinder chambers 21a and 21b in the slider 21 of the axis inclination adjusting structure 20 and the amount of air to be fed, depending upon the signal input thereto. This causes the slider 21 to move the bearing 17b in a diametric direction of the guide roller 17 to incline the roller 17 with respect to the surface of the endless belt 14, so that the deviation of the endless belt 14 may be corrected. This results in the endless belt 14 being controlled or adjusted to be constantly at a predetermined position, to thereby ensure continuous running of the rotating cylindrical treatment apparatus 10 with high accuracy and reliability.

FIGS. 5 to 8 show another embodiment of a rotating cylindrical treatment apparatus according to the present invention, wherein a cylindrical body is detailedly illustrated.

Figure 5:
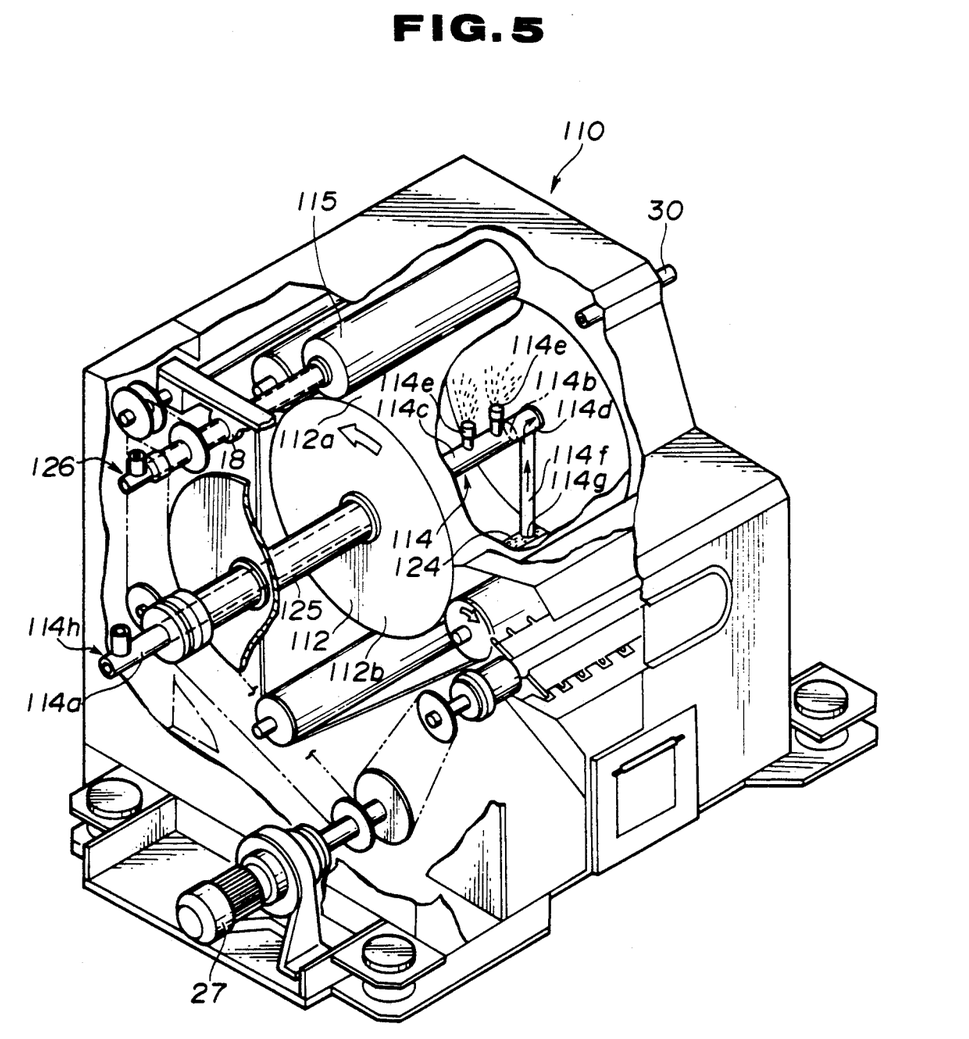
FIG. 5 is a partly cutaway perspective view showing another embodiment of a rotating cylindrical treatment apparatus according to the present invention.
Figure 6:
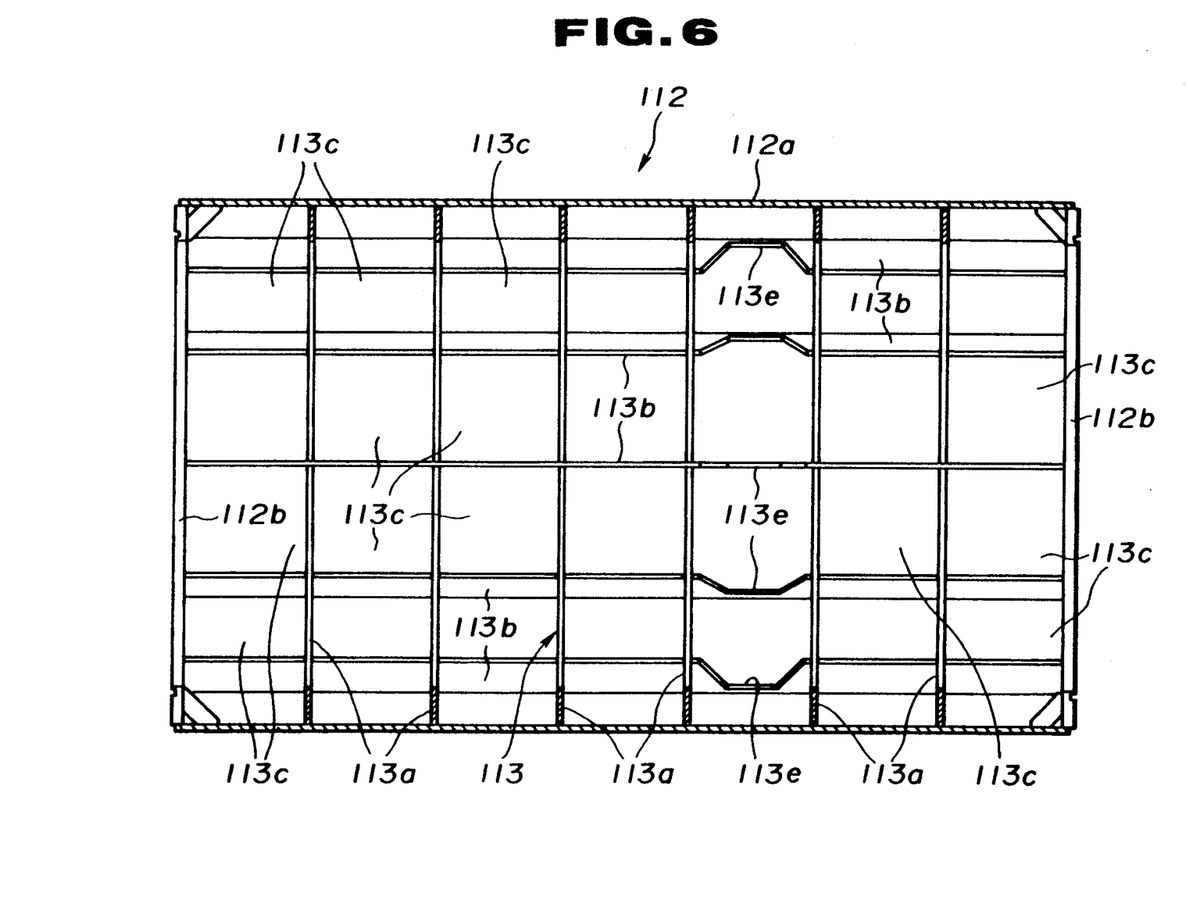
FIG. 6 is a sectional view showing an internal construction of a cylindrical body in the rotating cylindrical treatment apparatus of FIG. 5.
Figure 7:
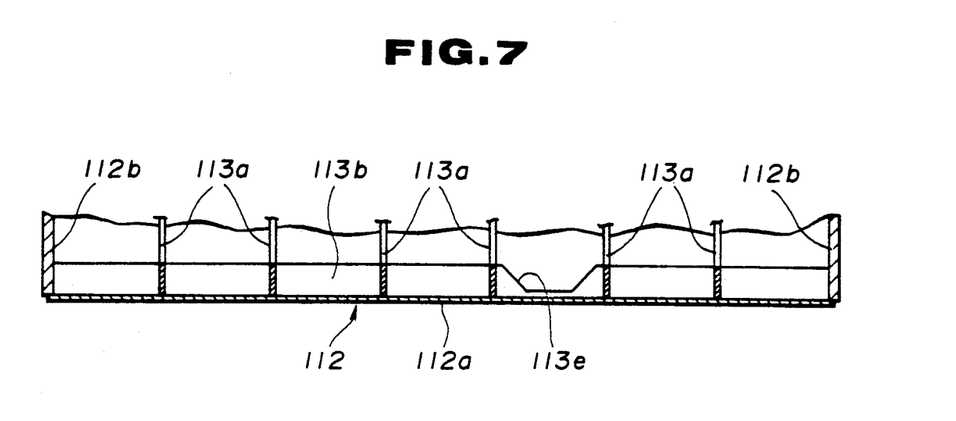
FIG. 7 is a fragmentary sectional view showing one of cross beams for a rib structure arranged in the cylindrical body shown in FIG. 6.
Figure 8:
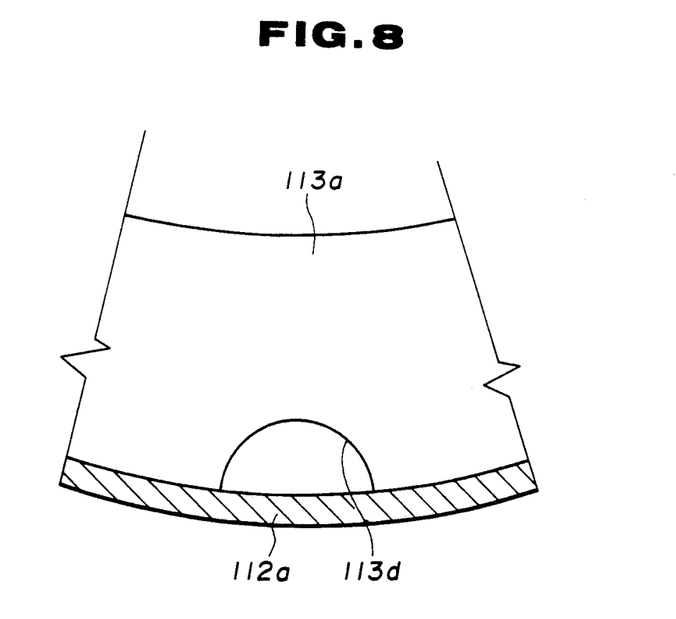
FIG. 8 is a fragmentary sectional view of the cylindrical body of FIG. 6 showing a cutout formed at a ring-like stiffening plate.

A cylindrical body designated at reference numeral 112 in FIGS. 5 and 6 includes a cylindrical or annular peripheral plate member 112a, which is reinforced by a rib structure 113 arranged therein. The rib structure 113, as shown in FIGS. 6, 7 and 8, includes a plurality of ring-like stiffening plates 113a arranged so as to be spaced from one another in an axial direction of the cylindrical body 112 and a plurality of cross beams 113b arranged between the stiffening plates 113a adjacent to one another in a manner to be spaced from one another at intervals in a circumferential direction of the cylindrical body 112. The cross beams 113b are also provided between end plates 112b of the cylindrical body 112 and the ring-like stiffening plates 113a adjacent thereto to increase the whole strength of the peripheral plate member 112a. In practice, the cross beams 113b are each made into a length sufficient to extend between both end plates 112b and are arranged in a manner to be spaced from each other at intervals in the circumferential direction of the cylindrical body 112. In this instance, the cross beams 113b and ring-like stiffening plates 113a are formed at positions thereof crossing each other with cutouts through which both members are engaged with each other to assemble the rib structure 113. Thus, the rib structure is formed of a plurality of ring-like stiffening plates 113a and a plurality of the cross beams 113b into a cylindrical lattice configuration. Then, the peripheral plate 112a is arranged on the rib structure 113 and both end plates 112b are attached to both ends of the rib structure 113, resulting in the cylindrical body 112 being constructed.

The arrangement of the so-constructed rib structure 113 in the cylindrical body 112 causes a number of compartments to be defined in a lattice-like manner in the cylindrical body 112, to thereby hinder a medium 124 introduced from a cooling or heating medium introducing and discharging unit 114 into the cylindrical body 112 from smoothly flowing toward a discharge pipe 114f in the cylindrical body 112 while being stored in a predetermined amount in the cylindrical body 112. In order to solve this problem, the ring-like stiffening plates 113a, as shown in FIG. 8, each are formed at an outer edge thereof with a semicircular cutout 113d for every compartment 113c, to thereby permit the cooling or heating medium 124 to effectively flow in the axial direction of the cylindrical body 112. Also, the cross beams 113b, as shown in FIGS. 6 and 7, each are formed with a depression 113e at a portion thereof positionally corresponding to a suction port 114g defined at a distal end of a discharge pipe 114f of the cooling or heating medium introducing or discharging unit 114 (FIG. 5), to thereby prevent the suction port 114g from colliding with the cross beam 113b during rotation of the cylindrical body 112.

The cooling or heating medium introducing and discharging unit 114 includes a single pipe 114a which has an internal passage defined therein and is inserted into a hollow support shaft 125 to axially extend through one of the end plates 112b into the cylindrical body 112. The internal passage of the pipe 114a is closed with a plug 114b positioned on the side of the other end plate 112b in the cylindrical body 112, so that the pipe 114a is substantially divided into an introduction-side portion 114c and a discharge-side portion 114d. The introduction-side portion 114c is provided with a plurality of nozzles 114e for spraying a heating or cooling gas-liquid mixture. To the discharge-side portion 114d is connected one end of a discharge pipe 114f, the other end 114g of which is arranged in proximity to the medium 124 stored in the lower portion of the cylindrical body 112 so as to serve as a suction port. Both ends of the pipe 114a are exposed from the support shaft 125 and serve as a medium introducing portion 114h and a medium discharge portion (not shown), respectively.

The remaining part of the illustrated embodiment may be constructed in substantially the same manner as the embodiment shown in FIGS. 1 to 3.

Figure 9:
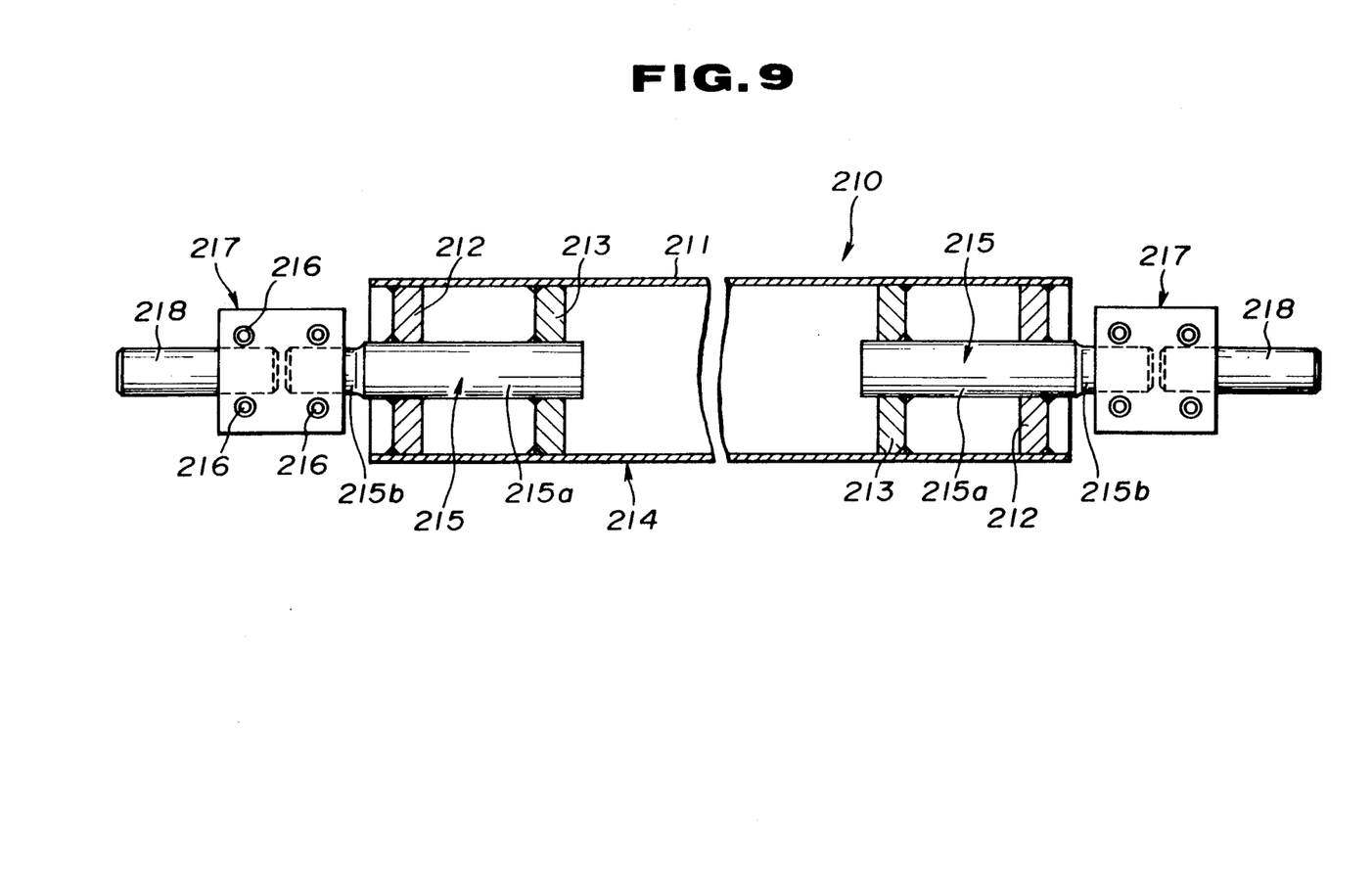
FIG. 9 is a sectional view showing a support roller for supporting an endless belt in a further embodiment of a rotating cylindrical treatment apparatus according to the present invention.

FIG. 9 shows a guide roller or a support roller for supporting an endless belt in another embodiment of a rotating cylindrical treatment apparatus according to the present invention.

A support roller generally designated at reference numeral 210 in FIG. 9 includes a roller body 214 comprising a hollow cylindrical member 211 and a pair of end plates 212 and 213 mounted in each of both ends of the cylindrical member 211 in a manner to be spaced from each other. In each of both ends of the roller body 214 is mounted a support shaft 215, which is inserted via through-holes formed at each of the end plates 212 and 213 in alignment with an axis of the roller body 214 and fixed to the end plates 212 and 213 by welding or the like.

The support shafts 215 fixed with respect to the end plates 212 and 213 arranged in both ends of the cylindrical member 211 each have a shaft body 215a formed into a diameter slightly larger than that of an extension 215b of the support shaft 215 which is formed so as to outwardly extend from each of the shaft bodies 215a, so that the support shaft 215 may support the roller body 214 thereon firmly and rigidly. The extension 215b of each of the support shafts 215 which laterally projects from the roller body 214 is connected to an auxiliary support shaft 218 through an axially-split coupler 217 integrated by means of fastening bolts 216. The auxiliary support shafts 218 each are rotatably supported by a bearing unit (not shown) mounted on a casing, a frame or a fixing section of the rotating cylindrical treatment apparatus.

The remaining part of the illustrated embodiment may be constructed in substantially the same manner as the embodiments described above.

Figure 10:
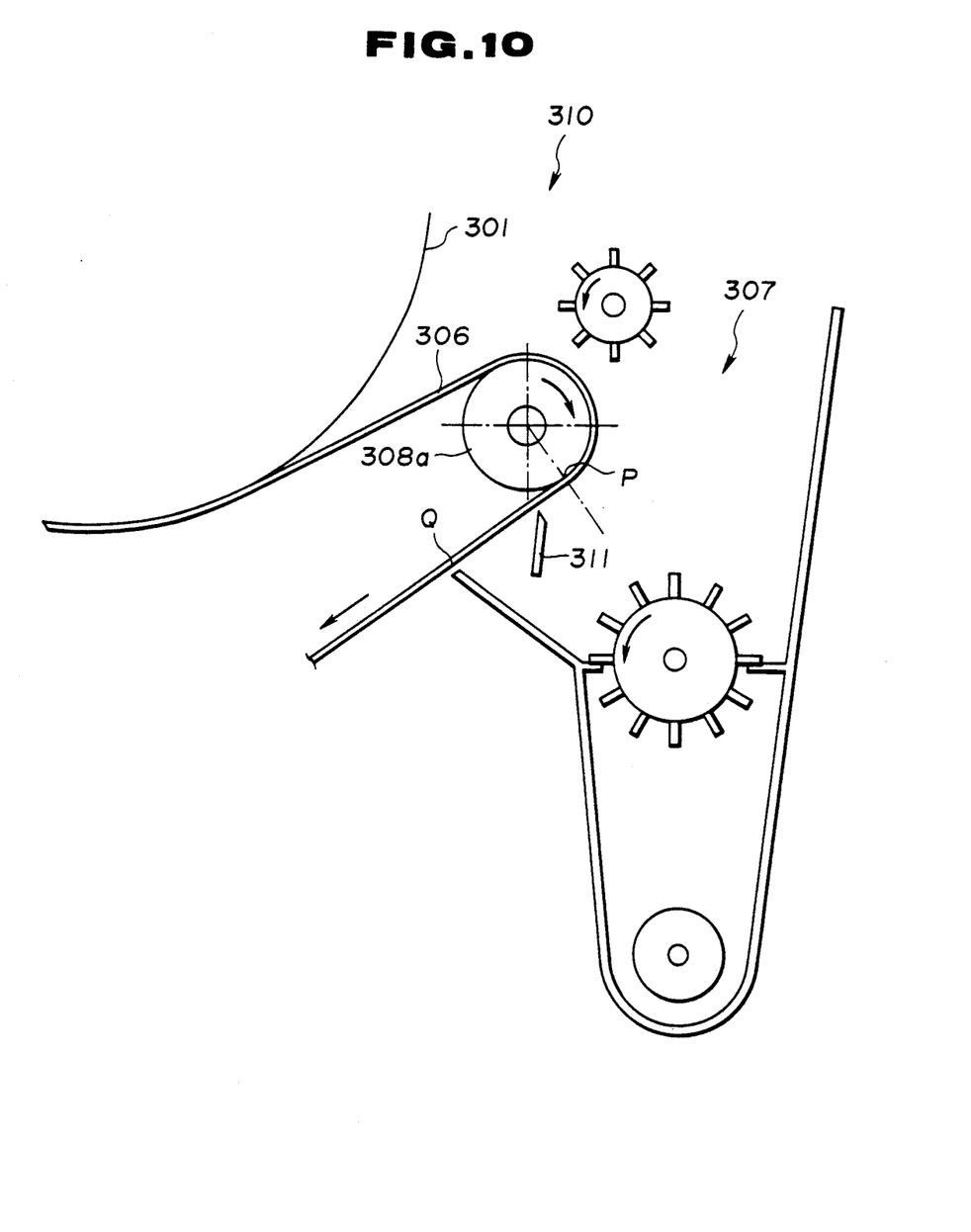
FIG. 10 is a schematic view showing an essential part of still another embodiment of a rotating cylindrical treatment apparatus according to the present invention.

FIG. 10 shows a scraper provided in proximity to an endless belt in still another embodiment of a rotating cylindrical treatment apparatus according to the present invention.

Generally if a belt is guided while being wound on a support roller or the like, a side of the support roller on which engagement of the belt with the support roller starts is called a belt approach side and that of the support roller on which the engagement terminates is called a belt leaving side. Also, a contact start position on the belt approach side at which contact of the belt with the roller starts and a contact termination position on the belt leaving side at which the contacts terminates each are called a contact point.

In a rotating cylindrical treatment apparatus of the illustrated embodiment generally designated at reference numeral 310 in FIG. 10, a scraper 311 is arranged so that its tip end is opposite to a portion of an endless belt 306 in a region between a contact point P on a belt leaving side of a support roller 308a arranged on the side of an outlet portion of a region of the endless belt 306 wound on a cylindrical body 301, and a point Q on the endless belt in advance of the point P in a direction of travel of the endless belt 306. However, the region does not include the contact point P on the belt leaving side. Also, the point Q is a limit position for permitting a treated material scraped away from the endless belt 306 by the scraper 311 to be introduced into a crusher 307, at which limit position an end of a hopper of the crusher 307 is adjacent to a portion of the endless belt 306 on the belt leaving side. Therefore, in practice, a location at which the tip end of the scraper 311 is positioned does not include the point Q and is defined on the side of the support roller 308a based on the point Q.

Further, the scraper 311 is arranged at an angle larger than an angle of repose to prevent crushed particle or powders of the treated material from accumulating thereon.

In the rotating cylindrical treatment apparatus 310 of the illustrated embodiment, when the treated material conveyed on the endless belt 306 while being pressed against a surface of the cylindrical body 301 a in the related art leaves the region of the endless belt 306 wound on the cylindrical body 301, it is removed from the surface of the cylindrical body 301 to drop into the crusher 307. At this time, a portion of the treated material remaining on the endless belt 306 is scraped away or peeled from the endless belt 306 by the scraper 311 arranged between the contact point P on the belt leaving side of the support roller 308a arranged on the side of the outlet portion of the region of the endless belt 306 wound on the cylindrical body 301, and the point Q on the endless belt in advance of the point P in the direction of traveling of the endless belt. It would happen that fine blocks of the treated material produced during crushing of the treated material are caught in a gap of a micro distance between the tip end of the scraper 311 and the surface of the endless belt 306. However, the fine blocks are permitted to pass through the gap without being forcibly rubbed against the endless belt 306, because a portion of the endless belt 306 opposite to the tip end of the scraper 311 is apart from a region of the endless belt 306 contacted with the support roller 308a to cause the endless belt 306 to be deflected in a direction of increasing the gap. This results in effectively preventing the surface of the endless belt from being damaged.

The remaining part of the illustrated embodiment may be constructed in substantially the same manner as the above-described embodiments.

Figure 11:
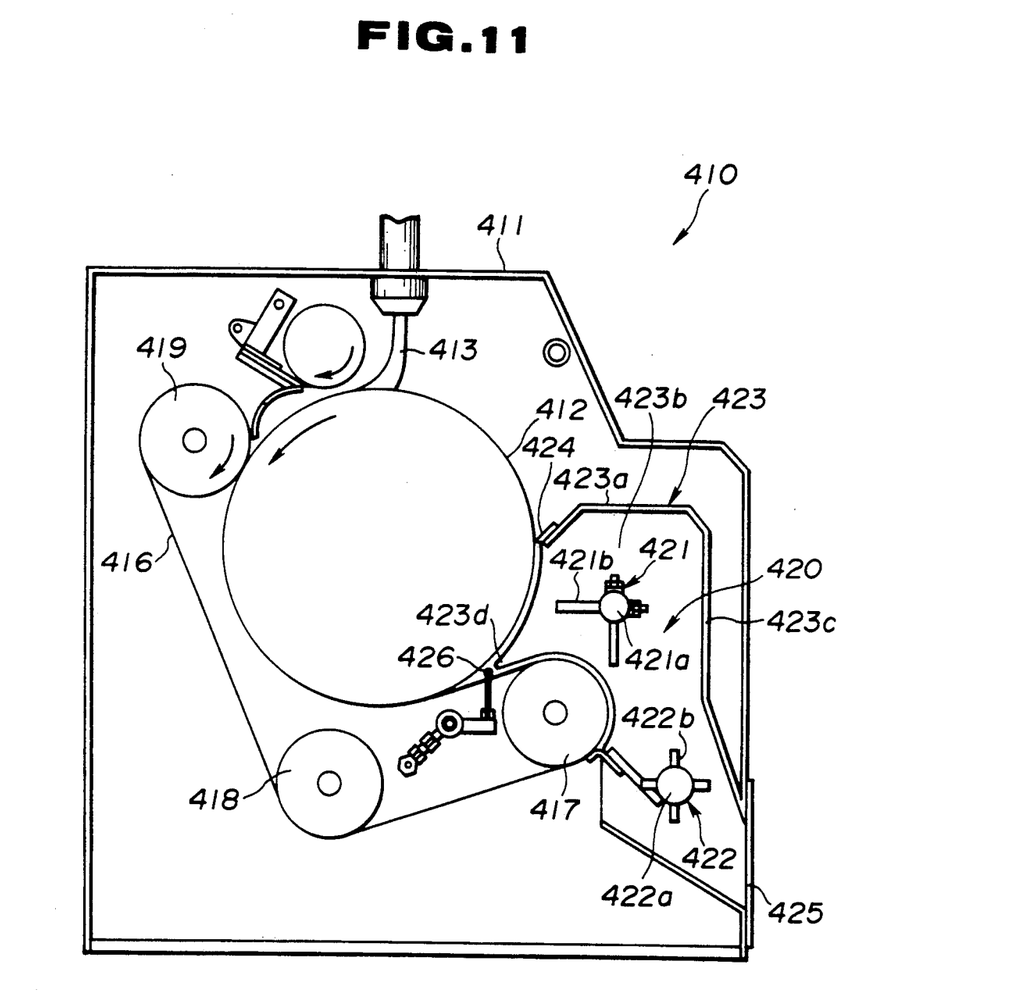
FIG. 11 is a vertical sectional view of the rotating cylindrical treatment apparatus shown in FIG. 10.

Referring now to FIG. 11 showing another embodiment of a rotating cylindrical treatment apparatus according to the present invention, a rotating cylindrical treatment apparatus of the illustrated embodiment generally designated at reference numeral 410 includes a crusher 420 arranged in proximity to an outlet portion of a region of an endless belt 416 wound on a cylindrical body 412 for crushing a treated material 413 of a strip-like shape subjected to a heating or cooling treatment while being pressed against a surface of the cylindrical body 412. The crusher 420 includes two crushing rollers 421 and 422 rotatably arranged, each of which includes a rod-like member 421a (422a) arranged in parallel to a revolving axis of the cylindrical body 412 and a plurality of pin-like projections 421b (422b) radially provided on the rod 421a (422a). One crushing roller 421 is adapted to relatively coarsely crush the treated material discharged from the outlet portion of the region of the endless belt 416 wound on the cylindrical body 412. For this purpose, the crushing roller 421 is arranged at a position which permits the pin-like projections 421b to collide with the treated material 413 which is to drop when the endless belt 416 leaving the surface of the cylindrical body 412 is turned by a guide roller 417, to thereby crush the treated material. The other crushing roller 422 is positioned right below the crushing roller 421 so as to more finely crush the treated material 413 coarsely crushed by the crushing roller 421.

The crusher 420 comprising the two crushing rollers 421 and 422 is surrounded at a portion thereof with a cover 423 except at both a portion opposite to the cylindrical body 412 and a lower portion through which the crushed material is taken out. The cover 423 is formed of an upper plate 423a, both side end plates 423b and a front end plate 423c opposite to the cylindrical body 412. On an end portion of the upper plate 423a adjacent to the cylindrical body 412 is mounted a scraper 424 for removing, from the cylindrical body 412, the treated material 413 remaining on the surface of the cylindrical body 412. The outlet portion of the region of the endless belt 416 wound on the cylindrical body 412 cooperates with the peripheral surface of the cylindrical body 412 and a portion of the endless belt leaving the outlet portion to form a sideward V-shaped space. Such a construction permits both side end plates 423b of the cover 423 to be provided with a projection 423d which is arranged so as to extend to a separation position at which the endless belt 416 leaves the cylindrical body 412 while being kept in close proximity to both the peripheral surface of the cylindrical body 412 and the endless belt 416. The cover 423 is formed at a lower portion thereof into a hollow cylindrical shape, of which a lower opening communicates with an outlet port provided at a casing 411 for taking out the crushed treated material 413.

The above-described construction of the illustrated embodiment causes the V-shaped space defined at the outlet portion of the region of the endless belt wound on the cylindrical body 412 to be substantially narrowed toward the above-described separation position, so that it is highly difficult to approach a distal end of the projection 423d of each of the side end plates to the separation position as much as possible even when the distal end is formed into a tapered shape. This causes a triangular gap to be formed in proximity to the separation position, through which fine particles or powders produced during the crushing of the treated material would leak.

In order to avoid the above problem, the rotating cylindrical treatment apparatus of the illustrated embodiment includes an air injection nozzle 426 arranged on each of both sides of the cylindrical body 412 in a manner to be directed to the gap, so that air is blown against the gap from the outside of the cover 423 to prevent the fine powders from outward leaking. The air injection nozzles 426 may be connected through a connection pipe to a suitable air feed source (not shown) such as, for example, an air compressor.

The remaining part of the embodiment shown in FIG. 11 may be constructed in substantially the same manner as the embodiments described above.

Figure 12:
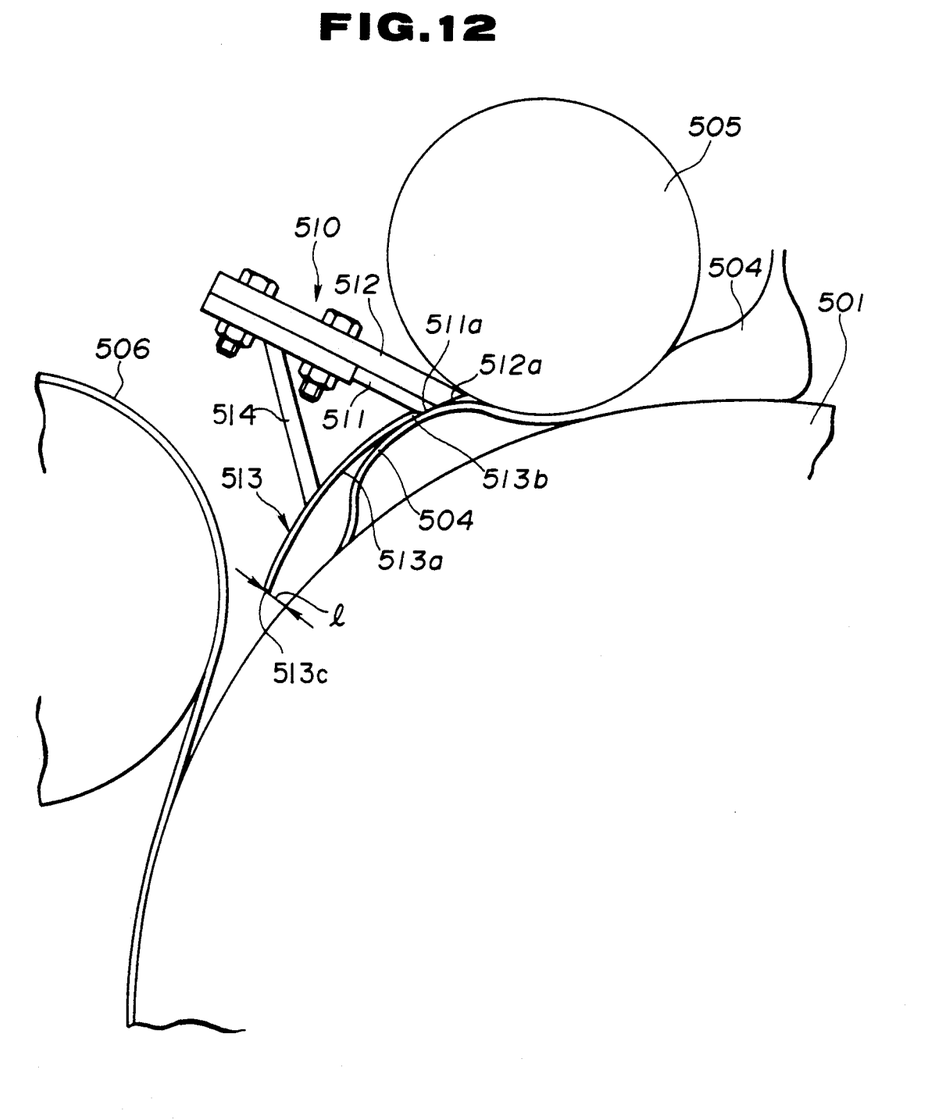
FIG. 12 is a fragmentary schematic view showing a pressure roller and components arranged adjacent to the pressure roller in a still further embodiment of a rotating cylindrical treatment apparatus according to the present invention.

FIG. 12 shows a further embodiment of a rotating cylindrical treatment apparatus according to the present invention. A rotating cylindrical treatment apparatus includes a scraper 510 arranged in proximity to a pressure roller 505 on the side of an outlet for a treated rolled material 504. The scraper 510 includes a support base 511 rigidly mounted on a frame of the apparatus such as a casing or the like, on which a scraper body 512 made of a tetrafluoroethylene resin material is fixedly mounted by means of bolts so that a distal end thereof is contacted with a peripheral surface of the pressure roller 505. End surfaces 511a and 512a of the support base 511 and scraper body 512 facing a cylindrical body 501 serving as relief surfaces are formed to be substantially parallel with the surface of the cylindrical body 501. The end surface 511a of the support base 511 is coated with tetrafluoroethylene or subject to specular finish. The reason why the scraper body 512 is formed of tetrafluoroethylene and the end surface 511a of the support base 511 is coated with tetrafluoroethylene or subject to specular finish is to permit the treated material to smoothly pass the end surfaces 511a and 512a of the support base 511 and scraper body 512 without adhering thereto. The reason why the whole scraper body 512 is formed of tetrafluoroethylene is that a relatively large frictional force acts on the end surface 512a of the scraper body 512 which first peels the treated material 504 adhered to the surface of the pressure roller 505 therefrom, to thereby cause friction to occur between the scraper body 512 and the treated material which is too large to permit tetrafluoroethylene coating of several microns in thickness to eliminate the friction.

The support base 511 of the scraper 510 is mounted with a guide plate 513. The guide plate 513, as shown in FIG. 12, has a surface 513a opposite to the surface of the cylindrical body 501, which surface 513a is formed into a concave or curved shape so that a side of the surface 513a facing the cylindrical body 501 is depressed. Also, the guide plate 513 has one end 513b fixed on a lower end of the end surface 511a of the support base 511 by welding or the like so that the concave surface 513a of the guide plate 513 is contiguous to the smoothly continuous relief surface comprising the end surfaces 511a and 512a of the support base 511 and scraper body 512. The scraper 510 also includes a support plate 514 of which one end is connected to a rear surface of an intermediate portion of the guide plate 513 in a lengthwise direction of the guide plate and the other end is fixed on the support base 511, so that the guide plate 513 may be rigidly held on the side of the outlet portion for the treated rolled material 504. The other end 513c of the guide plate 513 is positioned in proximity to the peripheral surface of the cylindrical body 501, so that the concave surface 513a of the guide plate 513 may be directed to the peripheral surface of the cylindrical body 501. Also, the other end 513b of the guide plate 513 is so positioned that a gap of a distance l which is sufficient to permit the treated material 504 of a maximum thickness to pass therethrough may be defined between the surface of the cylindrical body 501 and the end 513c.

The concave surface 513a of the guide plate 513, as noted from FIG. 12, serves as a guide surface for permitting the treated material 504 peeled from the pressure roller 505 by the scraper 510 to return to the surface of the cylindrical body 501, to thereby be kept contacted with the treated material during the treatment. Therefore, the concave surface 513a of the guide plate 513 is preferably coated with tetrafluoroethylene or subject to specular finish.

In the rotating cylindrical treatment apparatus of the illustrated embodiment, when the treated material 504 is undesirously separated from the surface of the cylindrical body 501 while adhering to the pressure roller 505 during rolling of the treated material, the scraper 510 peels the treated material from the pressure roller. In this instance, rolling of the treated material and feeding of the rolled treated material to the outlet portion for the treated rolled material 504 are successively carried out, therefore, the treated material 504 peeled from the pressure roller 505 would be forced to move in a direction away from the cylindrical body 501 through the underside of the scraper 510. However, such movement of the treated material 504 is effectively prevented due to abutment of the treated material against the concave surface 513a of the guide plate 513 acting as a guide surface, to thereby permit the treated material to return to the surface of the cylindrical body 501 while being kept contacted with the concave surface 513a, resulting in the treated material successfully getting in between the endless belt 506 and the cylindrical body 501. Thus, the treated material 504 peeled from the pressure roller 505 is permitted to automatically and rapidly return to the cylindrical body while being guided by the guide plate 513, so that the rotating cylindrical treatment apparatus continuously and rapidly accomplishes the treatment with high reliability.

The remaining part of the illustrated embodiment may be constructed in substantially the same manner as the embodiments described above.

As can be seen from the foregoing, the rotating cylindrical treatment apparatus of the present invention is so constructed that the deviation of the endless belt for pressing the treated material rolled by the pressure roller against the predetermined region of the outer peripheral surface of the cylindrical body is automatically corrected through the deviation detecting device and axis inclination adjusting structure. Such construction ensures continuous running of the rotating cylindrical treatment apparatus with high reliability and accuracy without requiring the stopping of the apparatus at every occurrence of deviation of the endless belt for correcting the deviation.

Also, the apparatus of the present invention may be so constructed that the rib structure which comprises the ring-like stiffening plates and cross beams and is adapted to ensure satisfactory flowing of the heating or cooling medium in the cylindrical body is provided in the cylindrical body. This permits the cylindrical body to be substantially large in size without causing deformation of the cylindrical body while maintaining the peripheral surface of the cylindrical body uniformly heated or cooled. Also, the rib structure aids thermal transmission from the heating or cooling medium to the cylindrical body because it acts to disturb and scatter the medium in all directions in the cylindrical body and serves as heat transfer fins.

Further, the support rollers for supporting the endless belt each may be constructed in such a manner as shown in FIG. 9. Such construction permits the connection between the support shaft and the roller body to be accomplished with increased strength without leading to a significant increase in weight, so that the rotating cylindrical treatment apparatus exhibits high durability and reliability.

In addition, in the present invention, the scraper may be arranged on the side of the portion of the endless belt adjacent to the contact point on the belt leaving side of the support roller arranged on the side of the outlet portion of the region of the endless belt wound on the cylindrical body. Such arrangement of the scraper effectively prevents the surface of the endless belt from being damaged even when finely crushed particles or powders of the treated material get in a micro gap between the tip end of the scraper and the surface of the endless belt, to thereby increase durability of the endless belt and ensure stable operation of the apparatus.

Furthermore, in the present invention, the apparatus may be surrounded with a cover, so that fine particles or powders produced during crushing of the treated material are prevented from scattering in the casing, resulting in effectively preventing pollution of the casing with the powders and accumulation of the powders on the actuation section of the apparatus. Thus, stable operation of the apparatus is ensured.

Moreover, the guide plate which is formed so as to be contiguous to the tip end surface of the scraper to provide a guide surface may be arranged. The guide surface is formed into a curved shape sufficient to permit the treated rolled material to return to the peripheral surface of the cylindrical body while preventing it from moving in a direction away from the cylindrical body. Thus, even when the treated material adheres to the pressure roller, it is allowed to not only be automatically peeled therefrom but return to the cylindrical body, so that the rotating cylindrical treatment apparatus accomplishes running operation with further increased reliability.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and desired to be secured by letters patent of the United States is:

1. A rotating cylindrical treatment apparatus comprising:

a cylindrical body rotatably arranged and including a heated or cooled surface to which a treated material is fed, said cylindrical body comprising means for introducing a cooling or heating medium into said cylindrical body;

a pressure roller for pressing the treated material fed to said surface of said cylindrical body against said surface of said cylindrical body;

an endless belt passed through at least three support rollers and partially wound on said surface of said cylindrical body to convey the rolled treated material while pressing it against said surface of said cylindrical body;

a deviation detecting device for detecting a deviation of said endless belt from a predetermined position on an outer peripheral surface of the cylindrical body in a leftward or rightward axial direction of the cylindrical body and generating a signal indicative thereof, said deviation detecting device being provided at a suitable position except a region of said endless belt wound on said cylindrical body; and an axis inclination structure for varying an inclination of at least one of said belt support rollers depending upon the signal generated from said deviation detecting device;

wherein said cylindrical body is formed of first and second end plates and a peripheral plate and includes a rib structure arranged therein for reinforcing said peripheral plate;

said rib structure comprising a plurality of ring-like stiffening plates spacedly arranged from said first end plate to said second end plate in an axial direction of said cylindrical body, and a plurality of cross beams arranged between said ring-like stiffening plates and spaced from one another at intervals in a circumferential direction of said cylindrical body, each of said cross beams extending from said first end plate to said second end plate;

said ring-like stiffening plates each being formed at an outer edge thereof with at least one cutout which defines an axial passage between each of said ring-like stiffening plates and said peripheral plate so as to permit a passage of said cooling or heating medium therethrough.

2. A rotating cylindrical treatment apparatus as defined in claim 1, wherein said support rollers each comprise a roller body comprising a hollow cylindrical member and a plurality of end plates arranged within each of both ends of said cylindrical member so as to be spaced form one another, and support shafts each inserted through and fixed to said end plates are arranged at each of both ends of said cylindrical member.

3. A rotating cylindrical treatment apparatus as defined in claim 1, further comprising a scraper arranged for scraping, from said endless belt, the treated material adhering to said endless belt in a direction of movement of said endless belt in proximity to a contact position on a belt leaving side of said support roller and arranged for varying movement of said endless belt in an opposite direction on the side of an outlet portion of a region of said endless belt wound on said cylindrical body and supporting said endless belt.

* * * * *